(12) United States Patent
Childe et al.

(10) Patent No.: US 10,729,218 B2
(45) Date of Patent: Aug. 4, 2020

(54) MOTOR AND A HANDHELD DEVICE HAVING A MOTOR

(71) Applicant: Dyson Technology Limited, Wiltshire (GB)

(72) Inventors: Matthew John Childe, Swindon (GB); Simon Alexander Locke, Swindon (GB); Martin Richard Harrex, Bristol (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 42 days.

(21) Appl. No.: 15/376,393

(22) Filed: Dec. 12, 2016

(65) Prior Publication Data

US 2017/0164711 A1 Jun. 15, 2017

(30) Foreign Application Priority Data

Dec. 11, 2015 (GB) .................................. 1521893.6

(51) Int. Cl.
*F04D 25/06* (2006.01)
*A45D 20/12* (2006.01)
(Continued)

(52) U.S. Cl.
CPC ............. *A45D 20/12* (2013.01); *A45D 20/00* (2013.01); *F04D 25/06* (2013.01); *F04D 29/053* (2013.01);
(Continued)

(58) Field of Classification Search
CPC ...... F04D 25/06; F04D 25/082; F04D 29/053; F04D 29/056; F04D 29/329; F04D 29/38;
(Continued)

(56) References Cited

U.S. PATENT DOCUMENTS 2,223,518 A * 12/1940 Heuberger ........... H02K 5/1672
384/280
3,196,300 A * 7/1965 Carlson ................... H02K 5/06
310/50
(Continued)

FOREIGN PATENT DOCUMENTS

CN 101523701 A 9/2009
CN 103166353 A 6/2013
(Continued)

OTHER PUBLICATIONS

Eastern Alloys, Inc. published 2014, URL: https://web.archive.org/web/20141021011257/http://www.eazall.com:80/advantages-of-zinc-alloys.*

(Continued)

*Primary Examiner* — Charles G Freay
*Assistant Examiner* — Thomas Fink
(74) *Attorney, Agent, or Firm* — Morrison & Foerster LLP

(57) ABSTRACT

A handheld device comprising a motor for generating an airflow through the device, the motor including: a frame for supporting a rotor assembly and a stator assembly, the frame including an inner wall and an outer wall and a plurality of diffuser vanes extending between the inner wall and outer wall; a rotor assembly including a shaft, a magnet, a bearing assembly and an impeller; and a stator assembly including a bobbin, a stator core and a winding wound around the bobbin; the frame being formed of zinc and the impeller being formed of aluminium.

10 Claims, 5 Drawing Sheets

(51) Int. Cl.

| | |
|---|---|
| *H02K 7/14* | (2006.01) |
| *H02K 5/173* | (2006.01) |
| *H02K 5/24* | (2006.01) |
| *A45D 20/00* | (2006.01) |
| *F04D 29/053* | (2006.01) |
| *F04D 29/056* | (2006.01) |
| *F04D 29/32* | (2006.01) |
| *F04D 29/38* | (2006.01) |
| *H02K 1/12* | (2006.01) |
| *H02K 1/27* | (2006.01) |
| *H02K 5/06* | (2006.01) |
| *H02K 7/08* | (2006.01) |
| *F26B 21/00* | (2006.01) |

(52) U.S. Cl.
CPC ......... *F04D 29/056* (2013.01); *F04D 29/329* (2013.01); *F04D 29/38* (2013.01); *H02K 1/12* (2013.01); *H02K 1/2706* (2013.01); *H02K 5/06* (2013.01); *H02K 5/1735* (2013.01); *H02K 5/24* (2013.01); *H02K 7/08* (2013.01); *H02K 7/14* (2013.01); *F26B 21/003* (2013.01)

(58) Field of Classification Search
CPC .......... H02K 9/06; H02K 5/1735; H02K 5/24; H02K 5/06; H02K 5/02; H02K 5/10; H02K 1/12; H02K 1/2706; H02K 7/08; H02K 5/14; H02K 7/145; H02K 21/003; A45D 20/12; A45D 20/00; A45D 20/10
See application file for complete search history.

(56) References Cited

U.S. PATENT DOCUMENTS

| | | | |
|---|---|---|---|
| 3,290,776 A | 12/1966 | Jepson et al. | |
| 3,397,463 A * | 8/1968 | Laing | A45D 20/10 34/97 |
| 3,414,121 A * | 12/1968 | Suzuki | B65D 81/113 206/320 |
| 3,439,204 A | 4/1969 | Ponczek et al. | |
| 4,308,670 A | 1/1982 | Bonnema | |
| 4,315,343 A * | 2/1982 | Neroda | H02K 7/14 15/339 |
| 4,329,606 A * | 5/1982 | Montagu | H02K 9/22 310/112 |
| 5,019,737 A | 5/1991 | Bruno | |
| 5,127,148 A * | 7/1992 | Lykes | H02K 5/15 29/596 |
| 5,288,203 A * | 2/1994 | Thomas | F04D 29/582 165/124 |
| 5,367,739 A * | 11/1994 | Johnson | B60S 3/002 15/316.1 |
| 5,513,951 A * | 5/1996 | Komoda | F04D 29/386 415/119 |
| 5,555,637 A * | 9/1996 | Montagnino | A45D 20/10 34/97 |
| 5,660,481 A * | 8/1997 | Ide | F16C 17/035 384/122 |
| 5,841,943 A * | 11/1998 | Nosenchuck | A45D 20/10 392/385 |
| 5,875,562 A * | 3/1999 | Fogarty | A45D 20/10 34/97 |
| 2001/0005943 A1* | 7/2001 | Fukumoto | A45D 20/10 34/96 |
| 2002/0098086 A1* | 7/2002 | Orlowski | F04D 29/646 415/213.1 |
| 2008/0043436 A1* | 2/2008 | Hung | G06F 1/20 361/700 |
| 2008/0313918 A1* | 12/2008 | Dyson | A47K 10/48 34/202 |
| 2009/0142204 A1 | 6/2009 | Yamamoto et al. | |
| 2010/0117468 A1 | 5/2010 | Kurita | |
| 2011/0006634 A1* | 1/2011 | Nomura | H02K 1/187 310/216.113 |
| 2013/0156573 A1* | 6/2013 | Kaji | F01D 25/162 415/229 |
| 2014/0065940 A1* | 3/2014 | Penlesky | F04D 25/14 454/230 |
| 2014/0134012 A1 | 5/2014 | Cho | |
| 2015/0007444 A1* | 1/2015 | Moloney | A45D 20/10 34/97 |
| 2015/0007854 A1* | 1/2015 | Moloney | A45D 20/10 132/271 |
| 2015/0037138 A1* | 2/2015 | Beers | F04D 19/00 415/107 |
| 2016/0245297 A1* | 8/2016 | Husted | F04D 29/284 |
| 2017/0164711 A1 | 6/2017 | Childe | |
| 2017/0367550 A1* | 12/2017 | Shiozawa | F04D 29/44 |
| 2018/0100517 A1* | 4/2018 | Sawada | A47L 9/00 |

FOREIGN PATENT DOCUMENTS

| | | |
|---|---|---|
| CN | 103821762 A | 5/2014 |
| CN | 206295038 U | 7/2017 |
| FR | 2 900 512 | 11/2007 |
| GB | 2 442 289 | 4/2008 |
| JP | 51-17808 | 2/1976 |
| JP | 60-105896 | 7/1985 |
| JP | 2001-178528 | 7/2001 |

OTHER PUBLICATIONS

Flotec, published 2014, URL: https://web.archive.org/web/20140701154841/http://flotecpump.com/ResidentialPage_FPZT_Zinc_Pump_Line.aspx.*

Brillcast Inc, published 2014, URL: https://web.archive.org/web/20150913003402/http://www.brillcast.com:80/aluminum-die-casting.html.*

International Search Report and Written Opinion, dated Feb. 16, 2017, directed to International Application No. PCT/GB2016/053705; 11 pages.

Search Report dated Jun. 14, 2016, directed to GB Application No. 1521893.6; 1 page.

First Office Action dated Mar. 16, 2020, directed to CN Application No. 201611141782.6; 17 pages.

* cited by examiner

MOTOR AND A HANDHELD DEVICE HAVING A MOTOR

REFERENCE TO RELATED APPLICATIONS

This application claims the priority of United Kingdom Application No. 1521893.6, filed Dec. 11, 2015, the entire contents of which are incorporated herein by reference.

FIELD OF THE INVENTION

The present invention relates to a handheld product comprising a motor.

BACKGROUND OF THE INVENTION

When developing a handheld product, it is important to consider a number of factors that will affect the end-user. For example, the size and weight of the product must be kept down in order that a user is able to handle the product easily, and that the product does not cause discomfort to the user during use. Another important consideration is that of noise. It is preferable that a handheld product does not produce a level of noise that is unpleasant and/or uncomfortable during use. What is more, excessive noise could potentially be damaging to a user's hearing if the product is used regularly over a long period of time. It is often the case that additional soundproofing, for example foam, is included in a product in order to maintain an acceptable level of noise generated by the product. Alternatively, the motor can be run at a lower power to reduce the level of noise that it generates. Of course, neither of these solutions are particularly desirable. Additional components or materials such as foam will increase the cost of the product, and running the motor at a lower power will negatively affect the performance of the product.

In handheld products which contain motors, it is often the motor that contributes the most towards the weight of the overall product and also towards the noise of the product during use. In smaller, handheld products, it is usual for many components of the motor to be formed of plastics which are more lightweight than other alternative materials.

SUMMARY OF THE INVENTION

Aspects of this invention provide a handheld product comprising a motor for generating an airflow through the product, the motor comprising: a frame for supporting a rotor assembly and a stator assembly, the frame comprising an inner wall and an outer wall and a plurality of diffuser vanes extending between the inner wall and outer wall; a rotor assembly comprising a shaft, a magnet, a bearing assembly and an impeller; and a stator assembly comprising a bobbin, a stator core and a winding wound round the bobbin; the frame being formed of zinc and the impeller being formed of aluminium.

As a result, the frame, being formed of zinc which is an acoustically dull material, is able to absorb some of the frequencies generated by the motor during use, and in particular the acoustic frequencies. This reduces the level of noise from the motor, and in turn reduces the overall noise generated by the handheld product during use. What is more, by forming the impeller from aluminium, which is an extremely light and strong material, this helps to counteract the additional weight included into the motor due to the use of zinc to form the frame. Therefore there is a synergistic effect in the use of zinc in the frame and aluminium in the impeller. The combination of the aluminium impeller and the zinc frame affords the motor improved acoustic characteristics, but without compromising the overall weight of the motor. Therefore, a handheld product can be achieved that is quieter during use, but without a significant increase to the weight of the overall product.

The magnet and the impeller may be fixed to the shaft either side of the bearing assembly. This allows the rotor assembly to be evenly balanced, and reduces the forces acting on the bearing assembly during use. This can extend the life of the motor.

The impeller may be an axial impeller. The frame may be formed from zinc by one or a combination of die-casting and machining. The outer wall of the frame may be substantially cylindrical and may have a substantially uniform internal diameter.

The bearing assembly may be mounted within the inner wall of the frame. This allows the inner wall to act as a protective sleeve for the bearing assembly. As such, no additional sleeve is required, and so the cost, weight and size of the motor can be reduced.

The impeller may be formed of machined aluminium, and may comprise a plurality of blades positioned radially around an inner hub. The inner hub of the impeller may comprises a recess. Accordingly, the weight of the impeller can be further reduced, and as such further counteracting the additional weight caused by the zinc frame.

The impeller may comprise 13 blades. As such, the blades of the impeller will generate a frequency during use that is high enough to be outside the typical hearing range of a human. Accordingly, the acoustic impact of the motor, and therefore the overall product, can be reduced.

During use, the rotor may spin at a speed of between 75 and 110 krpm to generate airflow through the product. This generates the desired level of air flow through the product, but exerts large forces on the impeller. However, being made of aluminium, the impeller is capable of withstanding these large forces.

The handheld product may be a hair care appliance, and may be one of a hair dryer, or a hot styling brush.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
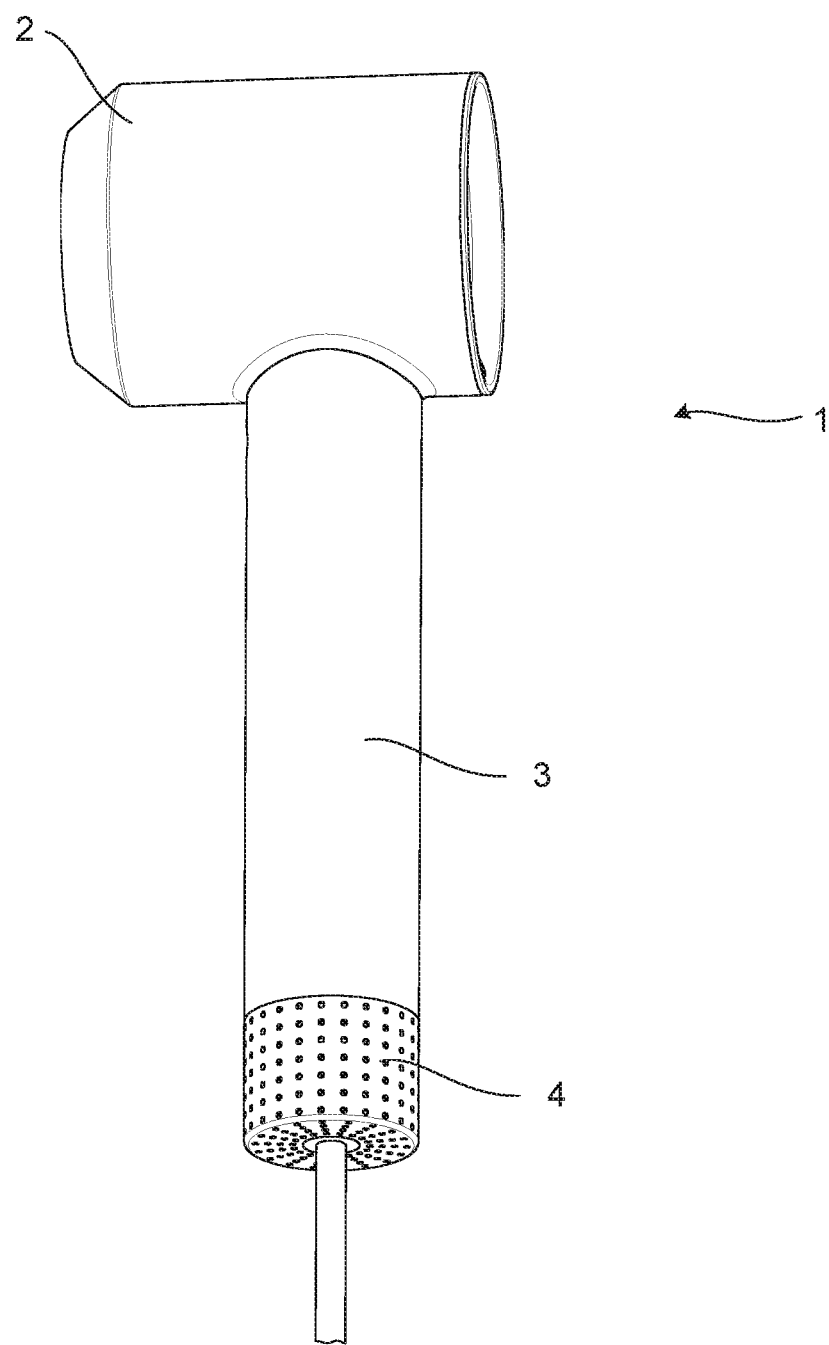
FIG. 1 is a handheld product in the form of a hair dryer.
Figure 2:
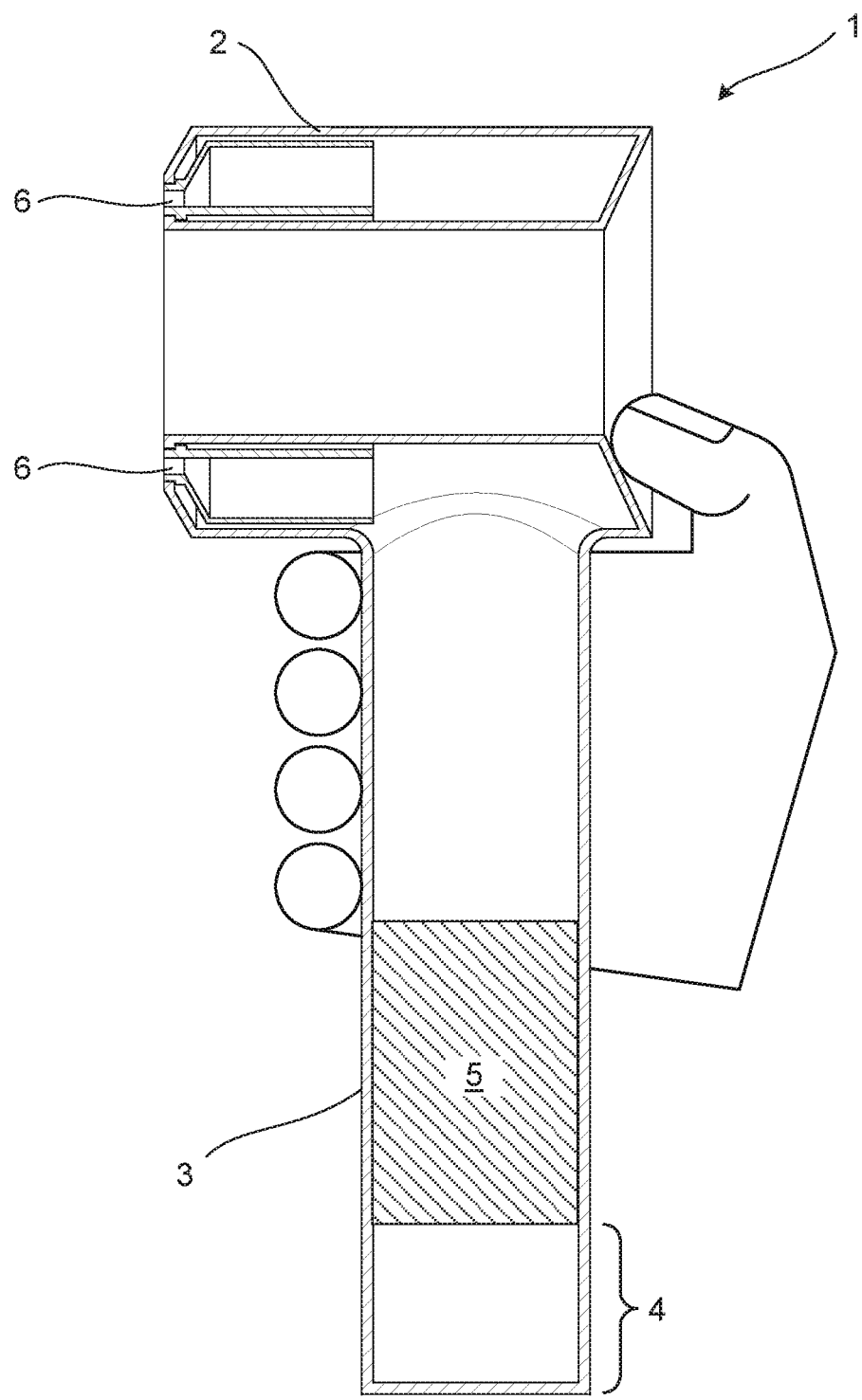
FIG. 2 is a cross section through the hair dryer of FIG. 1.

FIGS. 1 and 2 show a handheld product, represented by hair dryer 1. FIG. 2 is a schematic illustration of a cross section through the hair dryer 1. The hair dryer 1 has a body 2 through which air is expelled, and a handle 3 attached to the body 2 by which a user can hold the hair dryer 1 as shown in FIG. 2. The handle 3 comprises an air intake 4 at an end of the handle 3 opposite the body 2. A motor 5 is located within the handle 3 such that it is positioned next to, or at least close to, the air intake 4. A filter or other filtering means (not shown) may be provided at the air intake 4, or between the air intake 4 and the motor 5, to prevent foreign objects which may be entrained in the airflow, such as hair or dust, from entering the motor 5.

During use, the motor 5 generates an airflow through the hair dryer 1. The motor 5 draws air into the handle 3 through the air intake 4. Air then passes through the motor 5 and from the handle 3 into the body 2 where is directed towards an air outlet 6. A heater (not shown), for example in the form of one or more heating elements, may be provided in the hair dryer 1 to heat the air prior to it being expelled from the air outlet 6.

A hair dryer 1 is shown as an example in FIGS. 1 and 2, however the motor 5 could be used in other handheld products that require the generation of an airflow. For example, the motor 5 could be included in a different hair care appliance: for instance a hot styling brush.

Figure 3:
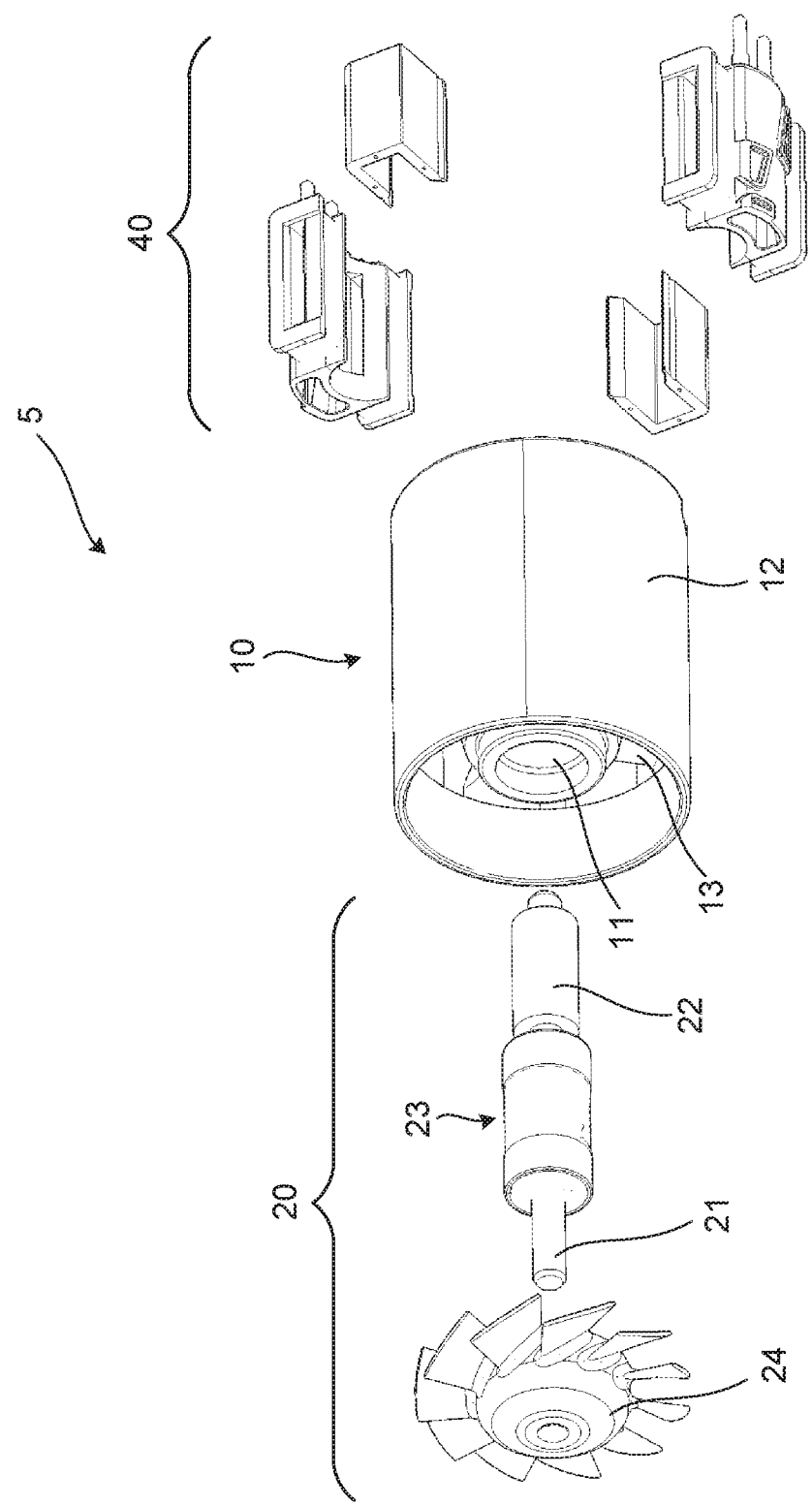
FIG. 3 is an exploded perspective view of a motor.
Figure 4:
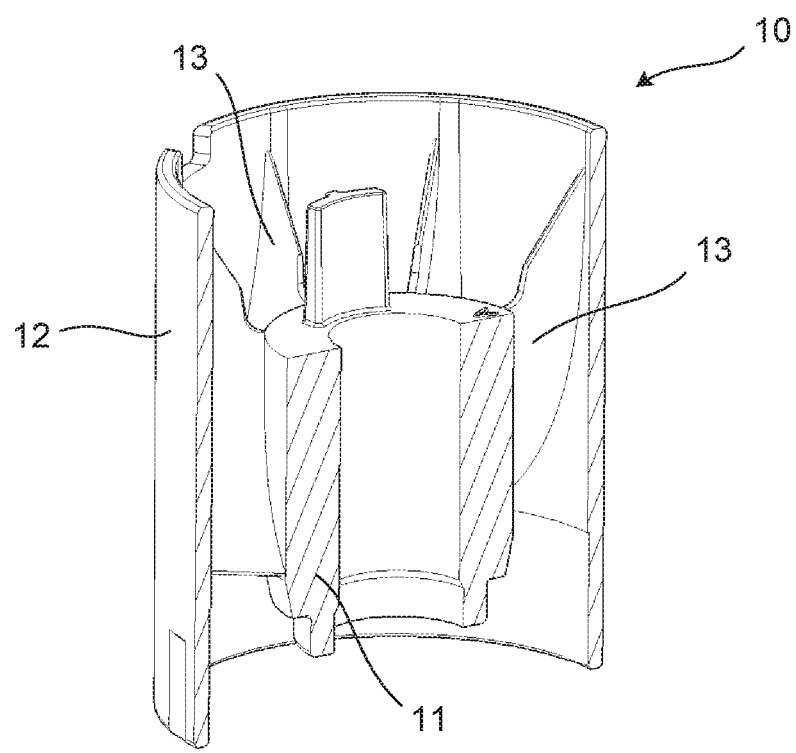
FIG. 4 shows a cross section through a frame of the motor of FIG. 3.

FIG. 3 is an exploded perspective view of the motor 5. The motor 5 comprises a frame 10, a rotor assembly 20 and a stator assembly 40. A cross section through the frame 10 is shown in FIG. 4. The frame 10 comprises an inner wall 11 and an outer wall 12. A number of diffuser vanes 13 extend between the inner wall 11 and the outer wall 12. The frame 10 is formed of zinc and can be formed, for example, by machining or die-casting, or a combination of both machining and die-casting. Zinc is an acoustically dull material and so the frame 10 is able to effectively absorb acoustic frequencies generated by the motor 5 during use. The zinc frame 10 therefore acts to reduce the overall level of noise generated by the product 1 during use.

Figure 5:
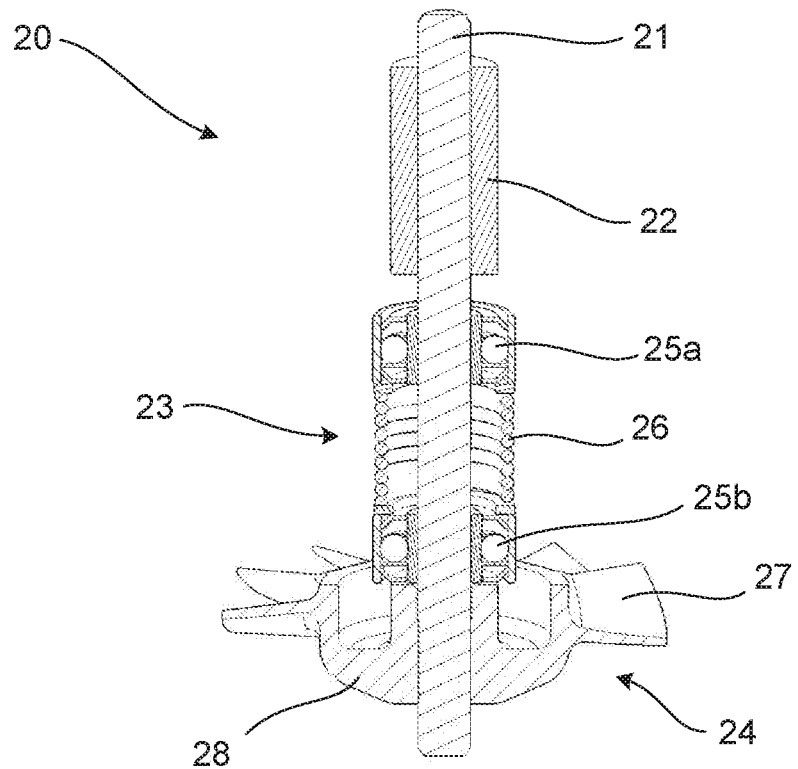
FIG. 5 shows a cross section through a rotor assembly of the motor of FIG. 3.

The rotor assembly 20 comprises a shaft 21, a magnet 22, a bearing assembly 23 and an impeller 24. A cross-section through the rotor assembly 20 is shown in FIG. 5. The magnet 22, bearing assembly 23 and impeller 24 are all fixed directly to the shaft 21 by one or a combination of an interference fit and adhesive. The magnet 22 is a bonded permanent magnet of the sort typically used in permanent magnet brushless motors. In the example shown, the magnet 22 is a four-pole permanent magnet. The bearing assembly 23 comprises a pair of bearings 25a, 25b and a spring 26 separating the bearings 25a, 25b. The spring 26 acts to pre-load each of the outer races of the bearings 25a, 25b to reduce wear of the bearings during use. Once the rotor assembly 20 is assembled into the frame 10, the inner wall 11 of the frame 10 acts as a protective sleeve around the bearing assembly 23. The outer races of the bearings 25 are fixed to the inside circumference of the inner wall 11 by adhesive.

Figure 6:
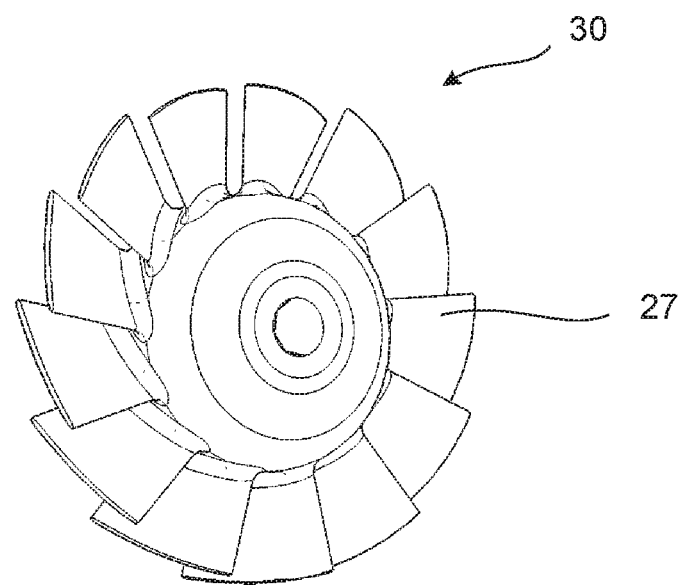
FIG. 6 is an axial impeller.

The impeller 24 shown in the Figures is an axial impeller with a plurality of blades 27 spaced circumferentially around, and extending radially out from, a central hub 28. During use, as each blade 27 spins, it creates sound waves at a specific frequency. It is therefore possible to design the impeller in such a way as to reduce its acoustic impact. The impeller 24 shown in FIGS. 3 and 5 comprises eleven blades. However, the number of blades 27 may differ according to the acoustic requirements of the motor 5 and/or handheld product. For example, an impeller 30 with thirteen blades 27 is shown in FIG. 6. During use, due to the higher number of smaller blades 27, the impeller 30 of FIG. 6 may generate an acoustic tone that has a higher frequency than the impeller 24 of FIG. 3 that has only eleven blades 27. At the expected operating speeds for the motor 5, the frequency of the tone generated by an impeller 30 with thirteen blades 27 is high enough so as to be outside the typical hearing range of a human. This reduces the acoustic impact of the motor 5 and goes even further to reduce the overall noise generated by the product, i.e. the hair dryer 1, during use.

The impeller 24, 30 is formed by machining aluminium. Aluminium is a very light material and therefore by using it to form the impeller 24, 30 this helps to counteract some of the additional weight included in the motor 5 by using zinc to create the frame 10. When used in a handheld product such as the hair dryer 1 of FIGS. 1 and 2, or another hair care product, the motor 5 will typically be run at rotational speeds of around 75 to 110 krpm. The magnitude of the forces acting on the impeller 24, 30 at these high speeds are very great. Thankfully, despite being light, aluminium is also very strong and so the impeller 24, 30 is capable of withstanding the large forces subjected to it when it rotates at high speed.

Figure 7:
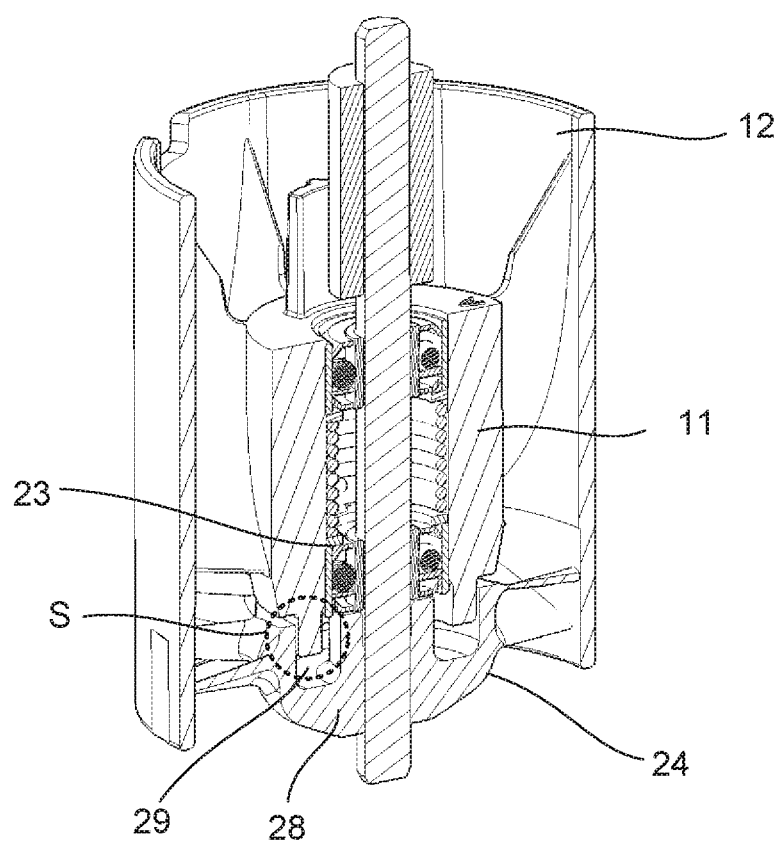
FIG. 7 shows a cross section through a partly assembled motor such as that shown in FIG. 3.

FIG. 5 shows that the hub 28 of the impeller 24 comprises a recess 29 in the downstream side of the hub. By having a recess 29, this further decreases the weight of the impeller 24, 30, which counteracts even more of the weight added by using zinc to form the frame 10. In addition, the recess 29 is annular and provides a cavity into which an axially extending portion or protrusion of the inner wall of the frame can extend. This creates a labyrinth seal inside the hub 28 of the impeller 24 which prevents foreign objects, such as hair and dust, from entering into the bearing assembly 23 which could damage the rotor assembly and significantly reduce the lifetime of the motor. The labyrinth seal can be seen in FIG. 7 which shows a cross section through the assembled frame 10 and rotor assembly 20. The labyrinth seal is highlighted at area S. FIG. 7 shows how the inner wall 11 of the frame 10 acts as a protective sleeve around the bearing assembly 23, as previously described.

Whilst particular embodiments have thus far been described, it will be understood that various modifications may be made without departing from the scope of the invention as defined by the claims.

The invention claimed is:

1. A hair care appliance comprising a handle and a motor located in the handle for generating an airflow through the hair care appliance, the motor comprising:
   a frame for supporting a rotor assembly and a stator assembly, the frame comprising an inner wall and an outer wall and a plurality of diffuser vanes extending between the inner wall and outer wall;
   a rotor assembly comprising a shaft, a magnet, a bearing assembly that comprises first and second spaced apart bearings that are positioned to one side of the magnet such that the magnet is cantilevered, and an impeller for generating airflow that flows between the inner and outer walls of the frame; and
   a stator assembly comprising a bobbin, a stator core and a winding wound around the bobbin, wherein the stator assembly surrounds the magnet of the rotor assembly;
   wherein the frame is formed of zinc and the impeller is formed of aluminium.

2. The handheld device of claim 1, wherein the magnet and the impeller are fixed to the shaft on opposite sides of the bearing assembly.

3. The handheld device of claim 1, wherein the impeller is an axial impeller.

4. The handheld device of claim 1, wherein the frame is formed from zinc by one or a combination of die-casting and machining.

5. The handheld device of claim 1, wherein the outer wall of the frame is cylindrical and has a uniform internal diameter.

6. The handheld device of claim 1, wherein the bearing assembly is mounted within the inner wall of the frame.

7. The handheld device of claim 1, wherein the impeller is formed of machined aluminium, and comprises a plurality of blades positioned radially around an inner hub.

8. The handheld device of claim 7, wherein the inner hub of the impeller comprises a recess.

9. The handheld device of claim 1, wherein the impeller comprises 13 blades.

10. The handheld device of claim 1, wherein, during use, the rotor spins at a speed of between 75 and 110 krpm to generate airflow through the device.

* * * * *